United States Patent
Shibazaki et al.

(10) Patent No.: US 7,124,648 B2
(45) Date of Patent: Oct. 24, 2006

(54) FORCE FEEDBACK INPUT DEVICE

(75) Inventors: Ken Shibazaki, Miyagi-ken (JP);
Ayumu Kobayashi, Fukushima-ken (JP)

(73) Assignee: ALPS Electric Co., Ltd., Tokyo (JP)

( * ) Notice: Subject to any disclaimer, the term of this patent is extended or adjusted under 35 U.S.C. 154(b) by 0 days.

(21) Appl. No.: 10/842,901

(22) Filed: May 11, 2004

(65) Prior Publication Data

US 2004/0231434 A1 Nov. 25, 2004

(30) Foreign Application Priority Data

May 19, 2003 (JP) ............................. 2003-140567
Jun. 25, 2003 (JP) ............................. 2003-180365

(51) Int. Cl.
*G01L 3/00* (2006.01)

(52) U.S. Cl. .................................... 73/862.08

(58) Field of Classification Search .................... 200/4, 200/18, 14, 570; 338/162, 160, 167, 170; 73/862.08

See application file for complete search history.

(56) References Cited

U.S. PATENT DOCUMENTS

| | | | | |
|---|---|---|---|---|
| 5,886,310 A | * | 3/1999 | Kataoka et al. | 200/14 |
| 6,037,856 A | * | 3/2000 | Aizawa | 338/162 |
| 6,049,044 A | * | 4/2000 | Mizobuchi | 200/4 |
| 6,194,673 B1 | * | 2/2001 | Sato et al. | 200/4 |
| 6,218,635 B1 | * | 4/2001 | Shigemoto et al. | 200/570 |
| 6,388,212 B1 | * | 5/2002 | Ishihara et al. | 200/18 |
| 6,437,771 B1 | | 8/2002 | Rosenberg et al. | |
| 6,686,911 B1 | * | 2/2004 | Levin et al. | 345/184 |
| 6,809,275 B1 | * | 10/2004 | Cheng et al. | 200/14 |

FOREIGN PATENT DOCUMENTS

| | | | |
|---|---|---|---|
| JP | 2003-50639 | | 2/2003 |
| JP | 2003-050639 | * | 2/2003 |
| JP | 2003050639 | | 2/2003 |
| WO | WO 96/06392 | | 2/1996 |
| WO | WO 02/088864 | | 11/2002 |

OTHER PUBLICATIONS

Copy of the Search Report dated Apr. 4, 2006 for corresponding European Patent Application No. 04 01 1774.

* cited by examiner

*Primary Examiner*—Max Noori
(74) *Attorney, Agent, or Firm*—Brinks Hofer Gilson & Lione

(57) ABSTRACT

When a knob is turned by a predetermined turning angle α and this angle is detected by a rotary encoder, an electromagnetic brake is activated by a controller and the rotation of the knob is locked. Then, while the knob is locked by the electromagnetic brake, the controller determines whether an operating force was applied to the knob in direction A in which the turning angle of the knob is increased. If the controller determines that the operating force was not applied to the knob in direction A (if the operating force was applied in direction B), the locking of the knob is released.

22 Claims, 8 Drawing Sheets

FORCE FEEDBACK INPUT DEVICE

BACKGROUND OF THE INVENTION

This application claims the benefit of priority to Japanese Patent Application Nos. 2003-140567 and 2003-180365, herein incorporated by reference.

1. Field of the Invention

The present invention relates to an input device for outputting an operation signal for operating an electronic apparatus such as an in-vehicle electronic apparatus. More specifically, the invention relates to a force feedback input device having a knob that provides a predetermined dynamic sensation (force sensation) to the operator by applying a turning force to the knob in accordance with the turning angle.

2. Description of the Related Art

A known force feedback input device comprises a knob to be rotated manually, a rotary encoder for detecting the turning angle of the knob, a motor for applying a turning force to the knob, and a controller for controlling the motor in accordance with the turning angle of the knob detected by the rotary encoder and for outputting an operating signal corresponding to the turning angle of the knob to a separate device which is controlled by the knob.

By manually rotating a knob, the force feedback input device outputs an operating signal for operating an electric apparatus such as an in-vehicle electric apparatus. By operating the knob of the force feedback input device, for example, the airflow of an in-vehicle air conditioner may be controlled, the air outlet of the in-vehicle air conditioner may be switched, the volume and the tuning of the radio may be controlled, and the volume and the tone of the audio equipment may be controlled. Furthermore, the force feedback input device is applied in a so-called steer-by-wire system, which is installed on a steering apparatus to steer the vehicle and provide force feedback from the tires.

To control the air flow from an in-vehicle air conditioner, the knob is set, for example, so that when it is turned in a direction that increases the air flow, a motor applies a turning force to the knob in a direction opposite to the direction the knob is turned. In this way, as the knob is turned in the direction to increase the air flow, the turning force applied in the direction opposite to the direction the knob is turned is increased. In other words, the operator can sense how much he or she has turned the knob in the direction to increase the air flow through the increase in a sensation of resistance (force sensation) provided by the knob.

As well as the above-mentioned force feedback input device that provides a sensation of resistance as a force feedback, other force feedback input devices are known that provide a sensation of acceleration as a force feedback by applying a turning force in the direction the knob is turned or provide a sensation of clicking as a force feedback by reversing the turning force applied to the knob when the turning angle of the knob becomes greater than a predetermined turning angle, as is disclosed in Japanese Unexamined Patent Application Publication No. 2003-50639.

SUMMARY OF THE INVENTION

In the force feedback input device described above, the knob must be prevented from being turned by more than a predetermined turning angle. In other words, when the turning angle of the knob reaches a predetermined turning angle, the knob must be locked. Once the knob is locked, however, the problem is how to release the knob. For instance, if an instructing device for instructing the locking means to release the lock is disposed separately from the force feedback input device, the operator must perform a series of complicated operations of first letting go of the knob to operate the instructing device and then operating the knob again to release the locking of the knob.

An object of the present invention is to take into consideration the above-mentioned problem and provide a force feedback input device including locking means for stopping the rotation of the knob that is easy to operate to release the locking of the knob.

To achieve the above-mentioned object, the present invention provides a force feedback input device comprising a turning knob, turning angle detecting means for detecting the turning angle and the turning direction of the knob and for outputting a turning angle signal corresponding to the turning angle and the turning direction of the knob, turning force applying means for applying a turning force to the knob, locking means for stopping the rotation of the knob, and a controller for driving the locking means in accordance with the turning angle signal. The force feedback input device according to the present invention further comprises turning direction detecting means for detecting the direction of the operating force applied to the knob when the rotation of the knob is locked by the locking means. The controller of the force feedback input device determines whether the operating force is applied to the knob in a predetermined direction while the knob is locked. If the controller determines that the operating force is applied in the predetermined direction, the controller drives the locking means so that the knob continues to be locked. If the controller determines that the operating force is not applied in the predetermined direction, the controller drives the locking means so that the locking of the knob is released.

In the present invention structured as described above, when an operator turns the knob, the rotation of the knob is detected by turning angle detecting means and a turning angle signal corresponding to the turning angle of the knob is sent to the controller. Then, the controller sends a controlling signal corresponding to the turning angle of the knob to turning force applying means. In this way, the turning force applying means applies a turning force corresponding to the turning angle of the knob to the knob. In other words, in the present invention, by applying a turning force corresponding to the turning angle to the knob, the knob provides a predetermined dynamic sensation (force sensation) to the operator.

When the knob is turned to a predetermined turning angle, the predetermined turning angle is detected by the turning angle detecting means, and a turning angle signal corresponding to the predetermined turning angle is sent to the controller. Then, a controlling signal for locking the knob is sent from the controller to the locking means, and the knob is prevented from turning further than the predetermined turning angle. When the operator tries to turn the knob while the knob is locked, the direction of the operating force applied to the knob by the operator is detected by the turning direction detecting means, and a turning direction signal corresponding to the turning direction of the applied operating force is sent to the controller. Then, it is determined whether the turning direction of the operating force is applied in a predetermined direction. If the direction of the operating force is determined to be applied in the predetermined direction, a controlling signal for continuing the locking of the knob is sent from the controller to the locking means. In this way, the knob continues to be locked. If the direction of the operating force is determined not to be applied in the predetermined direction, a controlling signal for releasing the locking of the knob is sent from the controller to the locking means. In this way, the knob becomes rotatable in a direction that reduces the turning angle of the knob. Then, the knob is turned by the operating force applied by the operator.

According to the present invention, if an operating force is applied to the knob while the knob is locked, the locking of the knob is released. In this way, a force feedback input device that can be easily operated to release the locking of the knob may be provided.

The turning direction detecting means of the present invention is a strain gauge.

The knob and the turning angle detecting means of the present invention are supported by an elastic member that bends as the knob is turned while the knob is locked. The turning angle detecting means also functions as turning direction detecting means.

The elastic member of the present invention is interposed between the turning angle detecting means attached to the knob and the locking means.

The elastic member of the present invention is interposed between a chassis and the locking means in the chassis.

DESCRIPTION OF THE PREFERRED EMBODIMENTS

Embodiments of a force feedback input device according to the present invention will be described below.

First Embodiment

A first embodiment of the present invention will be described below by referring to FIGS. 1 to 3.

Figure 1:
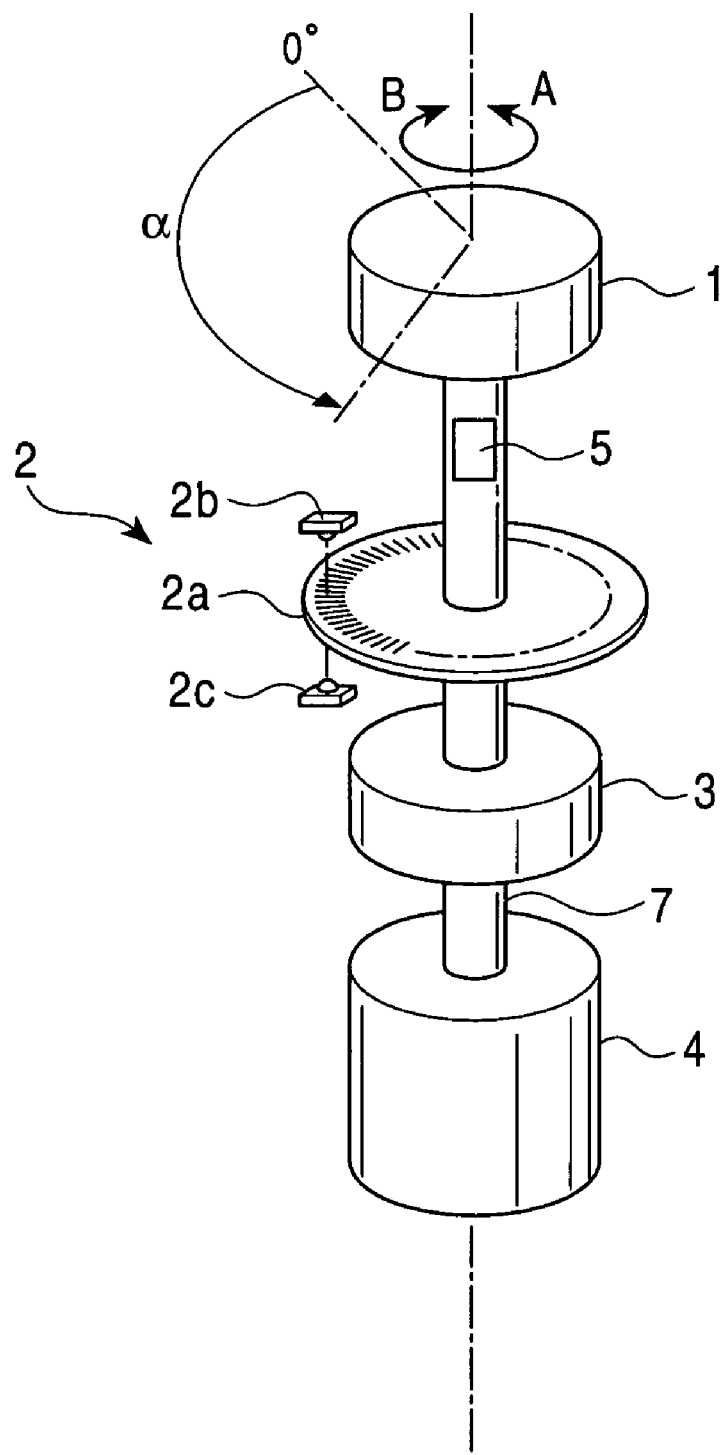
FIG. 1 is a perspective view of the basic structure of a first embodiment of the present invention.

FIG. 1 is a perspective view illustrating the basic structure of the first embodiment. FIG. 2 is a block diagram illustrating the electric system including a controller for the first embodiment. FIG. 3 is a flow chart describing the operating process of the first embodiment for continuing the locking of a knob and for releasing the locking of the knob.

The first embodiment of the present invention is an input device that outputs an operating signal for operating an electric apparatus such as an in-vehicle electric apparatus. By operating the input device, the airflow of an in-vehicle air conditioner may be controlled, the air outlet of the in-vehicle air conditioner may be switched, the volume and the tuning of a radio may be controlled, and the volume and the tone of audio equipment may be controlled. In particular, a force feedback input device for outputting an operating signal for controlling the air flow of an in-vehicle air conditioner will be described below.

As illustrated in FIG. 1, a knob 1 is manually turned, for example, by an operator, in direction A or B indicated by the arrows. The knob 1 is attached to a driving shaft 7. A rotary encoder 2 provides turning angle detecting means for detecting the turning angle of the knob 1 and for outputting a turning angle signal corresponding to the turning angle of the knob. The rotary encoder 2 includes a code plate 2a, which has a plurality of codes, e.g., slits, disposed along the circumference, an emitter 2b, which emits light towards the slits of the code plate 2a, and a receiver 2c, which receives the light that has passed through the slits and outputs a turning angle signal corresponding to the turning angle of the code plate 2a indicated by the light from the slits, i.e., the turning angle of the knob 1.

An electromagnetic brake 3 provides locking means for preventing the knob 1 from turning and is attached around the driving shaft 7. A motor 4 provides turning force applying means for applying a turning force to the knob 1 and has an output shaft connected directly to the driving shaft 7 of the knob 1. A strain gauge 5 provides turning direction detecting means for detecting the direction the knob 1 is turned while the knob 1 is locked by the electromagnetic brake 3 and for outputting a turning direction signal corresponding to the turning direction of the knob 1. The strain gauge 5 is attached to the outer surface of the driving shaft 7.

Figure 2:
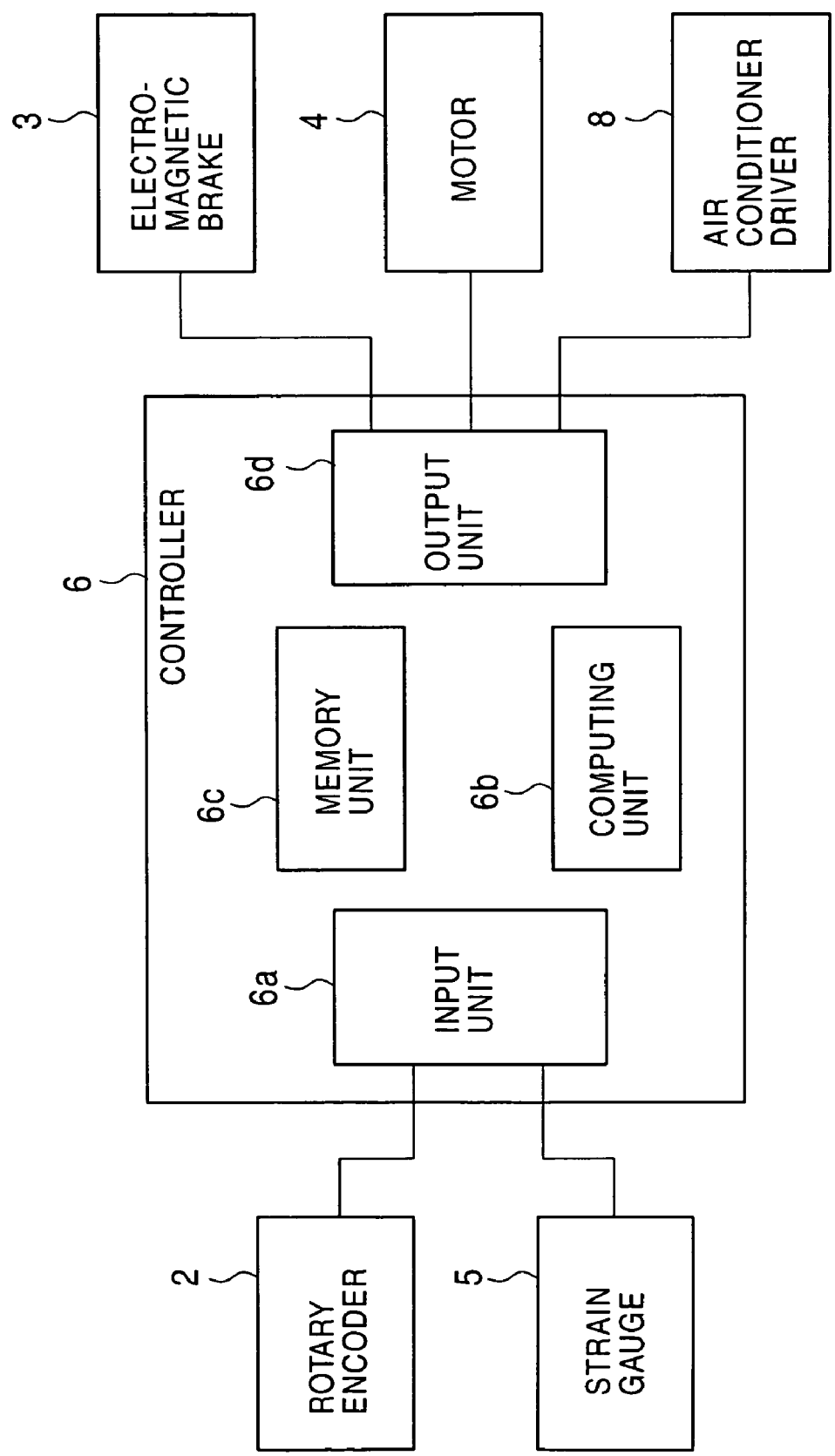
FIG. 2 is a block diagram of the electric system including a controller of the first embodiment of the present invention.
Figure 3:
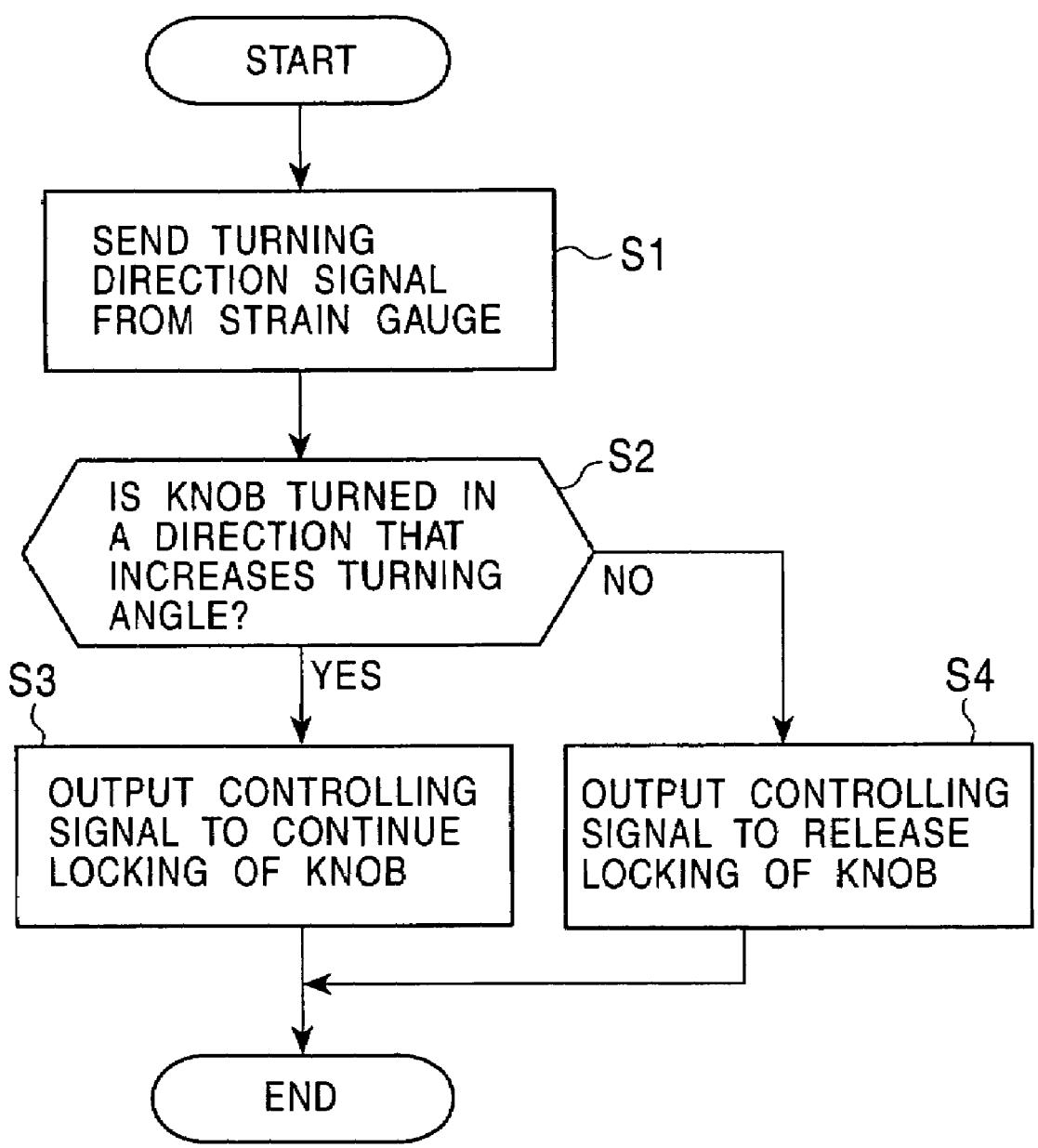
FIG. 3 is a flow chart describing the operating process of the first embodiment for continuing the locking of the knob and for releasing the locking of the knob.

As illustrated in FIG. 2, a controller 6 controls an air conditioner driver 8 to change the air flow of the air conditioner.

The controller 6 includes an input unit 6a, a computing unit 6b, a memory unit 6c, and an output unit 6d.

The input unit 6a receives a turning angle signal from the rotary encoder 2 and a turning direction signal from the strain gauge 5. The computing unit 6b computes the value of the operating signal from the air conditioner driver 8 corresponding to the turning angle signal sent to the input unit 6a and the motor controlling signal (voltage) for controlling the motor 4. The computing unit 6b also computes the value of the brake controlling signal (voltage) for controlling the electromagnetic brake 3 in response to the turning direction signal sent from the input unit 6a. The output unit 6d sends an operating signal, a motor controlling signal, and a brake controlling signal to the air conditioner driver 8, the motor 4, and the electromagnetic brake 3, respectively, in response to the computed results.

The computing unit 6b determines whether the knob 1 has reached a predetermined turning angle α. If the computing unit 6b determines that the knob 1 has been turned by a turning angle α, the electromagnetic brake 3 is activated to prevent the knob 1 from turning.

If an operating force is applied to the knob 1 after the computing unit 6b determines that the knob 1 has been turned by the turning angle α, the computing unit 6b determines whether the operating force is applied in direction A to increase the turning angle of the knob. If the computing unit 6b determines that the operating force applied to the knob 1 was in direction A, the knob 1 continues to be locked by the electromagnetic brake 3. If the computing unit 6b determines that the operating force applied to the knob 1 was not in direction A, i.e., the knob 1 was turned in direction B to decrease the turning angle of the knob 1, the electromagnetic brake 3 locking the knob 1 is released.

The memory unit 6c a controlling program for activating the controller 6, a first function used by the computing unit 6b for computing the value of the operating signal, a second function used by the computing unit 6b for computing the value of the motor controlling signal, and a computing equation for determining whether or not to continue locking the knob 1.

The first function defines, for example, the value of the operating signal corresponding to the operation of the air conditioner driver 8 for increasing the air flow as the knob 1 is further turned in direction A to increase the turning angle. The second function defines, for example, the value of the motor controlling signal corresponding to the driving force of the motor 4 for increasing the turning force in the direction opposite to direction A.

The first embodiment structured as described above operates as described below.

Assuming that the turning angle of the knob 1 before being turned is equal to a reference angle of 0°, when the operator turns the knob 1 from reference angle 0° in direction A, the turning angle measured from reference angle 0° of the knob 1 is detected by the rotary encoder 2. Then, a turning angle signal corresponding to the turning angle of the knob 1 is sent to the input unit 6a of the controller 6. Subsequently, the computing unit 6b computes the value of the operating signal corresponding to the turning angle of the knob 1 from the turning angle of the knob 1 and the first function stored in the memory unit 6c. An operating signal having the value computed by the computing unit 6b is sent from the output unit 6d to the air conditioner driver 8. In this way, the air conditioner driver 8 is activated to increase the air flow of the air conditioner.

At the same time the computing unit 6b computes the value of the operating signal, it also computes the value of the motor controlling signal corresponding to the turning angle of the knob 1 from the turning angle of the knob 1 and the second function stored in the memory unit 6c. The motor controlling signal having the value computed by the computing unit 6b is sent to the motor 4 from the output unit 6d. In this way, the motor 4 applies a turning force to the knob 1 in direction B, which is the direction opposite to the direction the knob 1 is turned, as a resistive force against the rotation of the knob 1. This resistive force increases as the turning angle of the knob 1 in direction A increases. In other words, the operator can sense how much he or she has turned the knob in direction A to increase the air flow through a sensation of resistance (force sensation) along with an increase in the resistive force.

When the knob 1 is turned by a predetermined turning angle α, this turning angle α is detected by the rotary encoder 2. Then, a turning angle signal corresponding to the turning angle α is sent to the input unit 6a of the controller 6. Subsequently, the computing unit 6b makes a decision to lock the knob 1 by applying the computing equation stored in the memory unit 6c. Accordingly, a brake controlling signal is sent to the electromagnetic brake 3 from the output unit 6d to lock the knob 1. In this way, the knob 1 is prevented from being turned further than the predetermined turning angle α.

If the operator tries to turn the knob 1 by applying an operating force to the knob 1 while the knob 1 is locked as described above, the steps described in FIG. 3 are carried out.

More specifically, the turning direction in which the knob 1 is turned is detected by the strain gauge 5. Then, a turning direction signal corresponding to the turning direction of the knob is sent to the input unit 6a of the controller 6 (step S1). Then, the computing unit 6b determines whether the knob 1 is turned in direction A that increases the turning angle of the knob 1 by applying the computing equation stored in the memory unit 6c (step S2).

If the computing unit 6b determines that the knob 1 has been turned in direction A (i.e., if step S2 is YES), a brake controlling signal to continue locking the knob 1 is sent to the electromagnetic brake 3 from the output unit 6d (step S3). If the computing unit 6b determines that the knob 1 has been turned in direction B and the turning angle of the knob 1 has not been increased (i.e., if step S2 is NO), the output unit 6d sends a brake controlling signal to release the locking of the knob 1 to the electromagnetic brake 3 (step 4). In this way, the knob 1 becomes rotatable and can be turned in direction B by the turning force applied to the knob 1.

According to the first embodiment, the following advantages are achieved.

When the knob 1 is locked and cannot be turned, the locking of the knob 1 can be released by applying an operating force in direction B to decrease the turning angle of the knob 1. In this way, the force feedback input device can be operated easily to release the locking of the knob 1. Consequently, the reliability of the force feedback input device is improved.

Second Embodiment

A second embodiment of the present invention will be described below by referring to FIG. 4.

Figure 4:
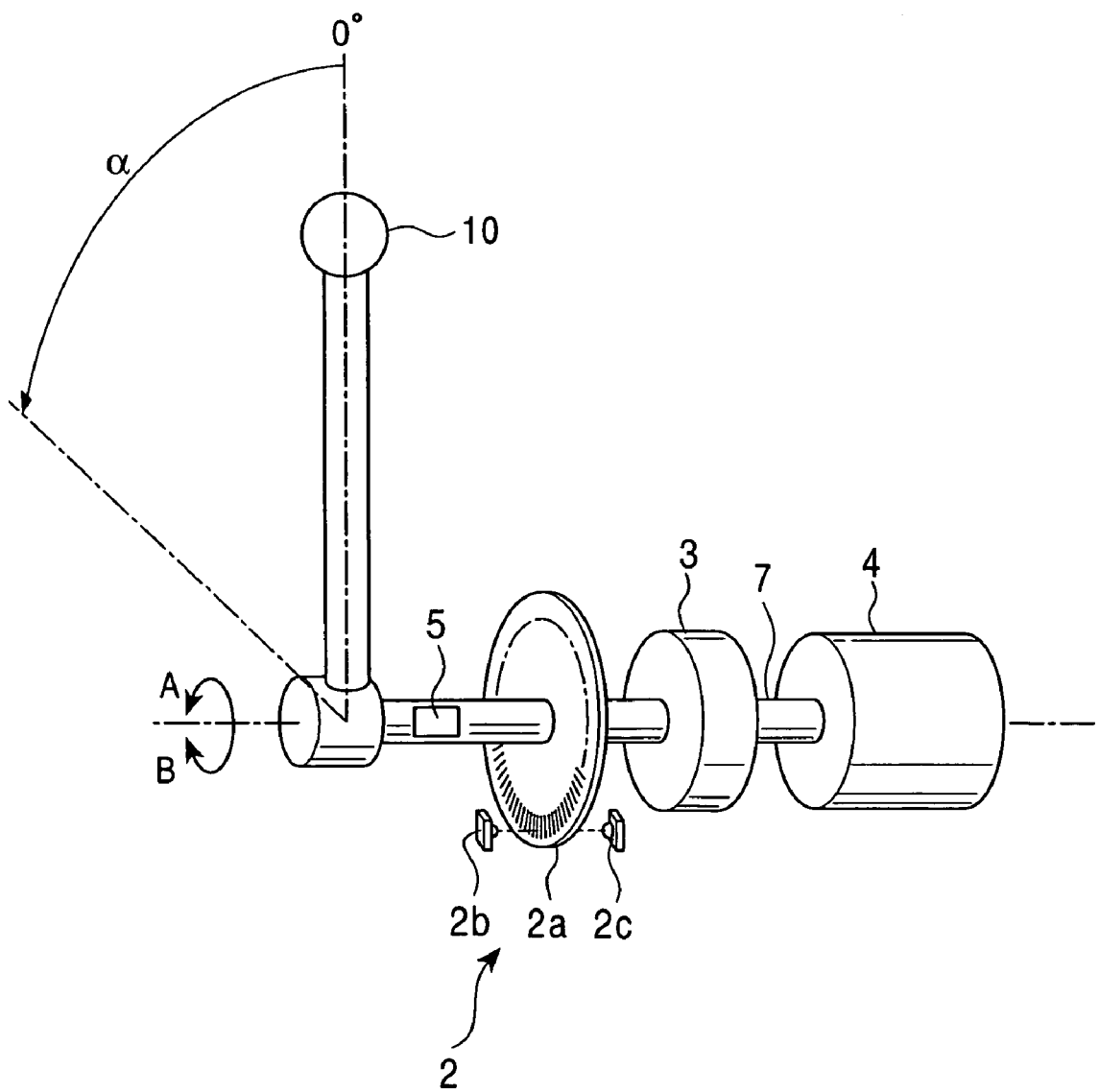
FIG. 4 is a perspective view of the basic structure of a second embodiment of the present invention.

FIG. 4 is a perspective view illustrating the basic structure of the second embodiment. In FIG. 4, the parts that are equivalent to those illustrated in FIG. 1 are indicated by the same reference numerals.

The second embodiment differs from the first embodiment in that the knob is an operating lever 10. The structure of the second embodiment except for this operating lever 10 is the same as the structure of the first embodiment.

The operating lever 10 according to the second embodiment operates in the same way as the knob 1 according to the first embodiment. More specifically, when the operator holds the operating lever 10 and pivots it in direction A, the pivoting angle of the operating lever 10 measured from the reference angle 0° is detected by the rotary encoder 2. Then, an operating signal with a value corresponding to the pivoting angle of the operating lever 10 is sent to the air conditioner driver 8 from the controller 6. Accordingly, the air conditioner driver 8 is activated and the air flow increases.

While the controller 6 outputs the operating signal, it also outputs a motor controlling signal. According to the motor controlling signal, a pivoting force is applied to the operating lever 10 from the motor 1 in direction B, which is the direction opposite to the direction the operating lever 10 is pivoted, to work as a resistive force against the pivoting of the operating lever 10. This resistive force increases as the pivoting angle of the operating lever 10 in direction A increases. In other words, the operator can sense how much he or she has pivoted the operating lever 10 in direction A to increase the air flow through an increase in a sensation of resistance (force sensation) provided by the operating lever 10.

When the pivoting angle of the operating lever 10 reaches a predetermined angle α, the operating lever 10 is locked by the electromagnetic brake 3.

By applying an operating force to the operating lever 10 in direction B while the operating lever 10 is locked, the locking of the operating lever 10 is released, allowing the operating lever 10 to be pivoted in direction B.

According to the second embodiment, a force feedback input device including an operating lever 10 can be operated easily to release the locking of the operating lever 10. Consequently, the reliability of the force feedback input device is improved.

In the first and second embodiments, the force feedback input devices provide a sensation of resistance as a force feedback. The present invention, however, is not limited to this. The force feedback input device may provide a sensation of acceleration as a force feedback by applying a turning/pivoting force in the same direction as the knob 1/operating lever 10 is turned or may provide a sensation of clicking as a force feedback by reversing the turning/pivoting force applied to the knob 1/operating lever 10 when the turning/pivoting angle of the knob 1/operating lever 10 is greater than a predetermined angle.

In the first and second embodiments, the receiver 2c of the rotary encoder 2 receives light emitted from the emitter 2b through the slits on the code plate 2a. In this case, the emitter 2b and the receiver 2c are formed separately. The present invention, however, is not limited to this structure. In other words, the rotary encoder 2 may include a code plate 2a having codes for reflecting light and an integrated emitter-receiver. In this way, the light emitted from the emitter is reflected at the codes and received by the receiver. For such a rotary encoder 2, the space required for installing the emitter 2b and the receiver 2c and the number of required parts can be reduced.

In the first and second embodiments, as illustrated in FIG. 1, the driving shaft 7 of the knob (knob 1 or operating lever 10) is directly connected to the output shaft of the motor 4. The present invention, however, is not limited to this structure, and the driving shaft 7 of the knob and the output shaft of the motor 4 may be connected by a reduction gear.

In the first and second embodiments, if the knob (knob 1 or operating lever 10) is locked, the lock is released when an operating force is applied in direction B. The present invention, however, is not limited to this structure, and the locking of the knob may be released when an operating force is applied in direction A.

Third Embodiment

Figure 6:
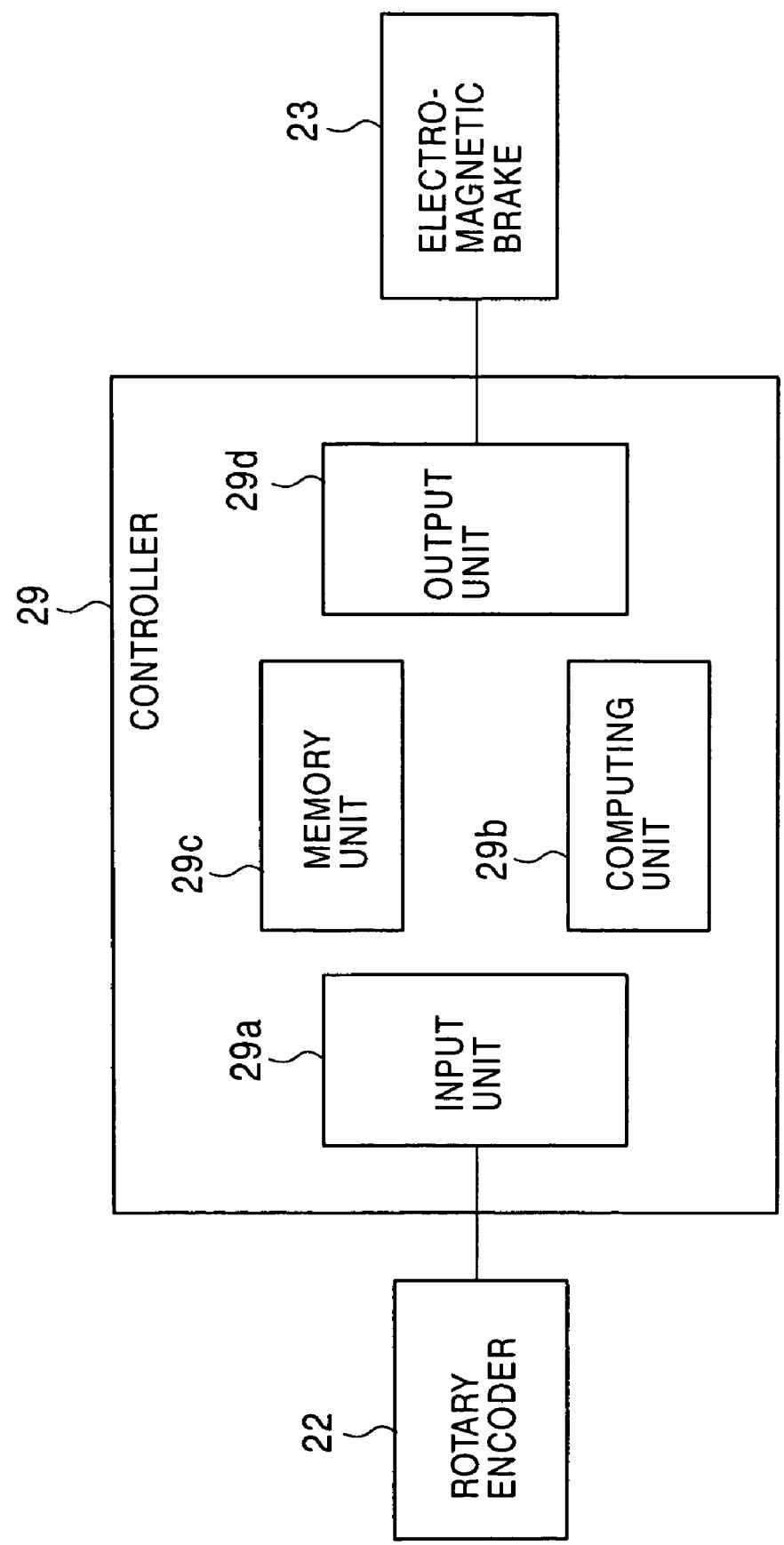
FIG. 6 is a block diagram of the electric system including a controller of the force feedback input device according to the third embodiment of the present invention.
Figure 7:
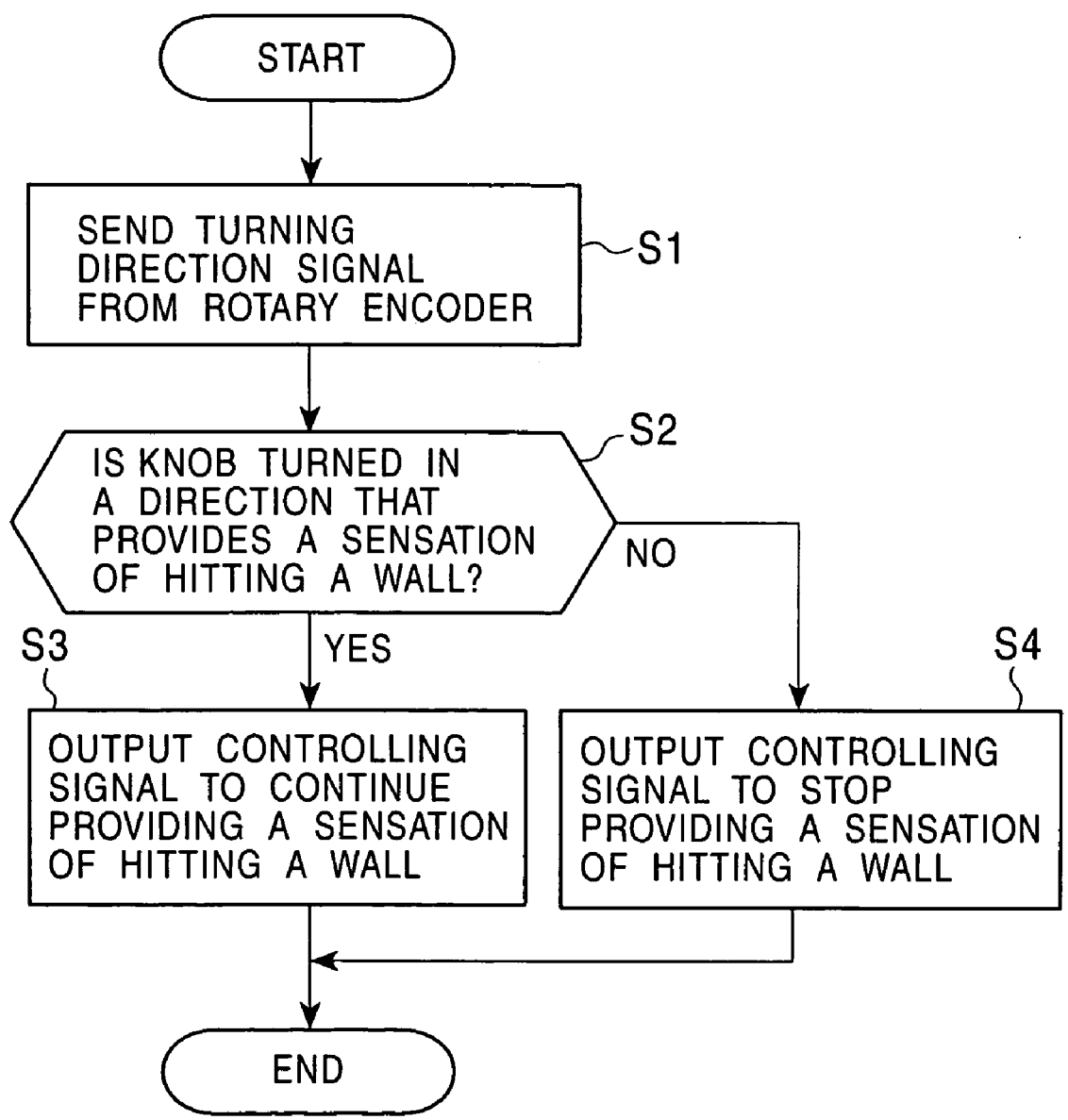
FIG. 7 is a flow chart describing the operating process of the operating knob according to the third embodiment of the present invention.

The third embodiment of the present invention will be described below by referring to FIGS. 5 to 7.

Figure 5:
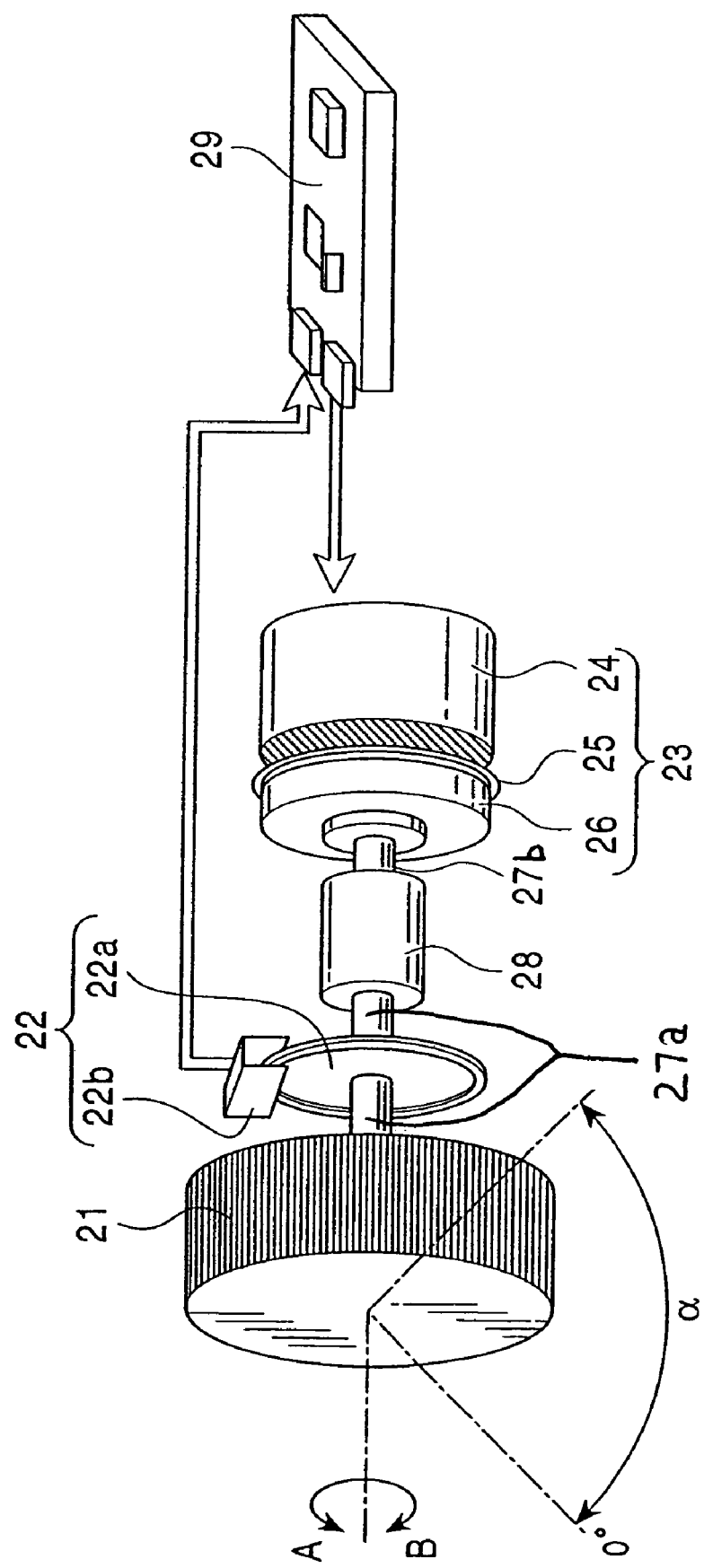
FIG. 5 is a perspective view of the structure of the force feedback input device according to a third embodiment.

In FIG. 5, an operating knob 21 is manually turned in directions A and B by an operator. A rotary encoder 22 is attached to a driving shaft 27a of the operating knob 21 to detect the turning angle of the driving shaft 27a i.e., the turning angle of the operating knob 21, and to send a turning angle signal corresponding to the detected turning angle. The rotary encoder 22 is fixed to the driving shaft 27a and includes a code plate 22a, which has a plurality of codes, e.g., slits, disposed along the circumference, and a sensor 22b, which has an emitter for emitting light to the slits of the code plate 22a and a receiver for receiving light through the slits and sending a turning angle signal corresponding to the turning angle of the code plate 22a, i.e., the turning angle of the operating knob 21. The sensor 22b is attached to a chassis (not depicted in the drawing) in which the operating knob 21 is journaled to.

An electromagnetic brake 23 is disposed around the driving shaft 27b and provides turning force applying means for applying a turning force to the operating knob 21 and turning force limiting means, which also functions as locking means, for preventing the operating knob 21 from turning. The electromagnetic brake 23 includes an electromagnet 24 with a built-in electromagnetic coil (not depicted in the drawing) wound around an iron core and arranged in a ring and a driver 26 having an armature 25 composed of an iron plate attached by a disc-shaped leaf spring. One of the faces of the driver 26 is disposed against one of the faces of the electromagnet 24 with a gap between the two faces.

The other face of the driver 26 is fixed to the driving shaft 27b so that the driver 26 is turnable in accordance with the operating knob 21. The electromagnet 24 is attached to a chassis (not depicted in the drawing) including the turning force limiting means.

An elastic member 28 is composed of a flexible material such as flexible elastomer or hard rubber. The substantially columnar elastic member 28 is interposed between the operating knob 21 and the driver 26 of the electromagnetic brake 23. The elastic member 28 is fixed to the driving shaft 27a and 27b between the code plate 22a of the rotary encoder 22 and the driver 26 of the electromagnetic brake 23.

When the operating knob 21 is turned while the operating knob 21 is locked by the electromagnetic brake 23, the turning direction of the operating force applied to the operating knob 21 is detected by the bending of the elastic member 28. Then, a turning direction signal corresponding to the turning direction of the operating knob 21 is sent from the rotary encoder 22.

A sufficient amount of bending of the elastic member 28 is equivalent to about 0.1° of the turning angle of the operating knob 21. The rotary encoder 22 detects the 0.1° rotation of the operating knob 21 through the elastic member 28 and sends a turning direction signal corresponding to the turning direction of the operating knob 21.

Since the elastic member 28 is composed of a flexible material such as flexible elastomer or hard rubber, its structure is simple. Thus, the locking of the operating knob 21 can be released without involving a complex structure.

A controller 29 includes an input unit 29a, a computing unit 29b, a memory unit 29c, and an output unit 29d. The input unit 29a receives a turning angle signal from the rotary encoder 22 and a turning direction signal. The computing unit 29b computes the value of the brake controlling signal (voltage) for controlling the electromagnetic brake 23 in response to the turning angle signal and the turning direction signal sent from the input unit 29a. The output unit 29d sends a controlling signal to the electromagnetic brake 23 in response to the computed results of the computing unit 29b.

The computing unit 29b determines whether the operating knob 21 has been turned by a predetermined turning angle α. If the computing unit 29b determines that the operating knob 21 has been turned by a turning angle α, the electromagnetic brake 23 is activated to lock the operating knob 21.

If an operating force is applied to the operating knob 21 after the computing unit 29b determines that the operating knob 21 has been turned by a turning angle α, the computing unit 29b determines whether the operating force is applied in direction A to increase the turning angle of the operating knob 21. If the computing unit 29b determines that the operating force has been applied to the operating knob 21 in direction A, the operating knob 21 continues to be locked by the electromagnetic brake 23. If the computing unit 29*b* determines that the operating force has not been applied to the operating knob 21 in direction A, i.e., the operating knob 21 has been turned in direction B to decrease the turning angle of the operating knob 21, the electromagnetic brake 23 locking the operating knob 21 is released.

The memory unit 29*c* stores a controlling program for activating the controller 29, a function used by the computing unit 29*b* for computing the value of the controlling signal, and a computing equation for determining the locking and the releasing of the operating knob 21.

The function defines, for example, the value of the controlling signal corresponding to the driving force of the electromagnetic brake 23 for increasing the turning force applied in the direction opposite to direction A.

The force feedback input device structured as described above operates as described below.

Assuming that the turning angle of the knob 21 before being turned is equal to a reference angle of 0°, when the operator turns the operating knob 21 from reference angle 0° in direction A, the turning angle measured from reference angle 0° of the operating knob 21 is detected by the rotary encoder 22. Then, a turning angle signal corresponding to the turning angle of the operating knob 21 is sent to the input unit 29*a* of the controller 29. Subsequently, the computing unit 29*b* computes the value of an operating signal corresponding to the turning angle of the operating knob 21 from the turning angle of the operating knob 21 and the function stored in the memory unit 29*c*. An operating signal having the value computed by the computing unit 29*b* is sent from the output unit 29*d*. In this way, the air flow of, for example, an air conditioner is increased.

At the same time, the computing unit 29*b* also computes the value of the controlling signal of the electromagnetic brake 23 corresponding to the turning angle of the operating knob 21. The controlling signal having the value computed by the computing unit 29*b* is sent to the electromagnetic brake 23 from the output unit 29*d*. In this way, the electromagnetic brake 23 applies a resistive force against the turning direction of the operating knob 21. This resistive force increases as the turning angle of the operating knob 21 in direction A increases. In other words, the operator can sense how much he or she has turned the knob in direction A to increase the air flow through the increase in sensation of resistance (force sensation) provided by the operating knob 21.

When the operating knob 21 is turned by a predetermined turning angle $\alpha$, this turning angle $\alpha$ is detected by the rotary encoder 22. Then, a turning angle signal corresponding to the turning angle $\alpha$ is sent to the input unit 29*a* of the controller 29. Subsequently, the computing unit 29*b* makes a decision to lock the operating knob 21 by applying the computing equation stored in the memory unit 29*c*. Accordingly, a brake controlling signal is sent to the electromagnetic brake 23 from the output unit 29*d* to lock of the operating knob 21. In this way, the operating knob 21 is prevented from being turned further than the predetermined turning angle $\alpha$.

If the operator tries to turn the operating knob 21 by applying an operating force to the operating knob 21 while the operating knob 21 is locked as described above, the steps described in FIG. 7 are carried out.

More specifically, when the operating knob 21 is locked (i.e., when there is a sensation of hitting a wall), the turning direction of the operating force applied to the operating knob 21 is detected by the rotary encoder 22 through the bending of the elastic member 28. Then, a turning direction signal corresponding to the turning direction of the operating force is sent to the input unit 29*a* of the controller 29 (step S1). Then, the computing unit 29*b* determines whether the operating force has been applied to the operating knob 21 in direction A providing a sensation of hitting a wall in which the turning angle of the operating knob 21 is increased according to the computing equation stored in the memory unit 29*c* (step S2).

If the computing unit 29*b* determines that the operating force has been applied to the operating knob 21 in direction A providing a sensation of hitting a wall (i.e., if step S2 is YES), a brake controlling signal for continuing the locking of the operating knob 21 is sent to the electromagnetic brake 23 from the output unit 29*d* (step S3), and the operating knob 21 continues to be locked. If the computing unit 29*b* determines that the operating force has been applied to the operating knob 21 in direction B in which the sensation of hitting a wall is reduced and the turning angle of the operating knob 21 is not increased (i.e., if step S2 is NO), the output unit 29*d* sends a brake controlling signal for releasing the locking of the operating knob 21 to the electromagnetic brake 23 (step 4). In this way, the operating knob 21 becomes rotatable and can be turned in direction B by the operating force applied to the operating knob 21.

According to the above-mentioned embodiment of the present invention, when the operating knob 21 is locked by the electromagnetic brake 23 and a sensation of hitting a wall is provided, the direction of the operating force applied to the operating knob 21 can be detected through the bending of the elastic member 28. Then, a turning direction signal corresponding to the turning direction of the operating knob 21 is sent to the rotary encoder 22. In this way, when an operating force is applied to the operating knob 21 in the direction increasing the turning angle, the operating knob 21 continues to be locked. When an operating force is applied to the operating knob 21 in the direction decreasing the turning angle, the operating knob 21 becomes rotatable. Therefore, even when the operating knob 21 is locked and a sensation of hitting a wall is provided, the locking of the operating knob 21 can be easily released by applying a slight amount of force. Consequently, the reliability of the force feedback input device is improved.

Since the elastic member 28 is interposed between the operating knob 21 and the electromagnetic brake 23, the structure becomes simple and the locking of the operating knob 21 can be sufficiently released.

By using the electromagnetic brake 23 as turning force limiting means, the electromagnet 24 and the armature 25 provide a strong adsorption force for preventing the operating knob 21 from turning.

Fourth Embodiment

Figure 8:
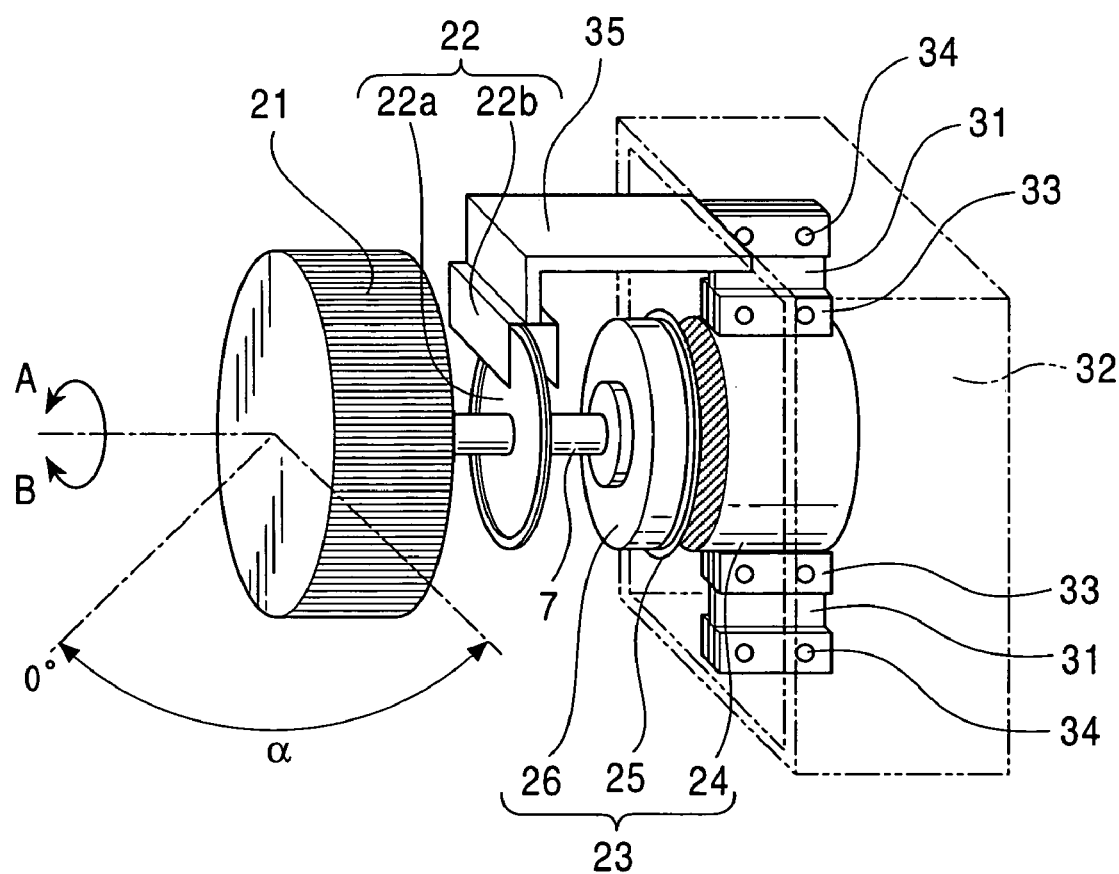
FIG. 8 is a perspective view of the structure of a force feedback input device according to a fourth embodiment of the present invention.

FIG. 8 illustrates another embodiment of the force feedback input device according to the present invention.

In FIG. 8, the parts that are equivalent to those illustrated in FIG. 5 are indicated by the same reference numerals and their descriptions are omitted.

In this embodiment, two plate elastic members 31 composed of flexible elastomer or hard rubber are disposed opposingly and connect a chassis 32 and an electromagnet 24, instead of the elastic member 28 show in FIG. 5. An operating knob 21 and a driver 26 of the electromagnetic brake 23 are connected directly by the driving shaft 27.

In this embodiment, the elastic members 31 are supported by connecting plates 33 and 34 and are disposed between the electromagnet 24 and the chassis 32. A sensor 22b of a rotary encoder 22 is fixed to a fixing plate 35 extending from the chassis 32.

In this embodiment, when the operating knob 21 is turned while the operating knob 21 is locked by the electromagnetic brake 23, the elastic members 31 bend. As a result, the sensor 22b detects the direction of the operating force applied to the operating knob 21. Then, the rotary encoder 22 sends a turning direction signal corresponding to the turning direction of the operating force. The opposing pair of elastic members 31 are twisted as the operating knob 21 is turned.

According to the structure of this embodiment, since the elastic members 31 are interposed between the electromagnetic brake 23 and the chassis 32 with the electromagnet 24 attached, the rotary encoder 22 may be installed not only adjacent to the operating knob 21 but also in any position. In this way, the space required for the structure may be minimized.

In the above-mentioned embodiment of the present invention, the force feedback input device provides a sensation of resistance as a force feedback. The present invention, however, is not limited to this, and other force feedback input devices that provide a sensation of acceleration or a sensation of clicking as a force feedback may be used.

The rotary encoder 22 according to the above-mentioned embodiment detects the transmission of light through the slits. Instead, a code plate having codes for reflecting the light may be used.

The electromagnetic brake 23 was used as turning force limiting means (i.e., turning force applying means and locking means). The present invention, however, is not limited to this, and an electromagnetic clutch may be used instead.

When the operating knob 21 is locked, the locking is released by applying an operating force to the operating knob 21 in direction B. The present invention, however, is not limited to this, and the lock may be released when an operating force is applied in direction A.

What is claimed is:

1. An input device comprising:
   a knob to be operated by turning;
   turning angle detecting means for detecting a turning angle and for outputting a turning angle signal corresponding to the turning angle of the knob;
   locking means for locking the knob and for stopping rotation of the knob;
   a controller for driving the locking means in accordance with the turning angle signal and for determining whether an operating force is applied to the knob in a predetermined turning direction while the knob is locked; and
   turning direction detecting means for detecting a turning direction of an operating force applied to the knob when the knob is locked and the rotation of the knob is stopped by the locking means;
   wherein the controller drives the locking means to continue locking the knob if the controller determines that the operating force is applied in the predetermined turning direction, and the controller drives the locking means to release the locking of the knob if the controller determines that the operating force is not applied in the predetermined turning direction.

2. The input device according to claim 1, wherein the turning direction detecting means is a strain gauge.

3. The input device according to claim 1, wherein an elastic member that bends when the knob is turned is interposed between the locking means and the turning angle detecting means and the turning angle detecting means also functions as the turning direction detecting means.

4. The input device according to claim 1, further comprising turning force applying means for applying a turning force to the knob.

5. The input device according to claim 1, further comprising an elastic member that bends when the knob is turned, wherein the elastic member is disposed between the locking means and a chassis to which a sensor of the turning angle detecting means is fixed, and wherein the turning angle detecting means also functions as the turning direction detecting means.

6. The input device according to claim 1, wherein the turning direction detecting means includes an elastic member that bends when the knob is turned.

7. The input device according to claim 6, wherein the elastic member is interposed between the turning angle detecting means and the locking means.

8. The input device according to claim 6, comprising a pair of elastic members disposed opposingly to the locking means, each of the elastic members connected to a side of a chassis.

9. An input device comprising:
   a driving shaft;
   a knob attached to the driving shaft, wherein turning of the knob defines a turning angle and a turning direction;
   a rotary encoder configured to detect the turning angle;
   a controller configured to receive a turning angle signal from the rotary encoder and to determine whether an operating force is applied to the knob in a predetermined turning direction while the knob is locked;
   an electromagnetic brake configured to lock the knob and to stop rotation of the knob when the knob is turned in a predetermined turning direction at a predetermined turning angle; and
   a turning direction detector configured to detect a turning direction of the operating force applied to the knob when the knob is locked and rotation of the knob is stopped by the electromagnetic brake;
   wherein the controller drives the electromagnetic brake to keep the knob locked if the operating force is applied in the predetermined direction and drives the electromagnetic brake to unlock the knob if the operating force is not applied in the predetermined direction.

10. The input device according to claim 9, wherein the controller sends the electromagnetic brake a brake controlling signal to prevent the knob from turning when the controller determines that a predetermined turning angle has been attained.

11. The input device according to claim 9, wherein the rotary encoder is attached to the driving shaft and interposed between the knob and the electromagnetic brake.

12. The input device according to claim 9, wherein the turning direction detector comprises a strain gauge to detect the turning direction of the operating force applied to the knob and send a turning direction signal to the controller when the knob is locked and rotation of the knob is stopped.

13. The input device according to claim 12, further comprising a motor attached to the driving shaft, the motor configured to receive the turning angle signal and to apply a turning force to the knob opposite to the direction of the operating force applied to the knob.

14. The input device according to claim 9, wherein the knob comprises a lever pivoting around the axis of the driving shaft.

15. The input device according to claim 9, wherein the turning direction detector comprises the rotary encoder and an elastic member that bends when the knob is turned.

16. The input device according to claim 1, wherein the controller drives the locking means to release the locking of the knob if the controller determines that operating force is applied in a direction opposite to the predetermined direction.

17. The input device according to claim 15, wherein the elastic member is interposed between the knob and the electromagnetic brake.

18. The input device according to claim 15, comprising a pair of elastic members disposed opposingly to the electromagnetic brake, each of the elastic members connected to a side of a chassis.

19. The input device according to claim 9, wherein the controller drives the electromagnetic brake to unlock the knob if the operating force is applied in a direction opposite to the predetermined direction.

20. A force feedback input device comprising:
a knob to be operated by turning;
turning angle detecting means for detecting a turning angle and for outputting a turning angle signal corresponding to the turning angle and the turning direction of the knob;
turning force applying means for applying a turning force to the knob;
locking means for stopping rotation of the knob;
a controller for driving the locking means in accordance with the turning angle signal; and
turning direction detecting means for detecting a direction of an operating force applied to the knob when the rotation of the knob is locked by the locking means;
wherein the controller determines whether the operating force is applied to the knob in a predetermined direction while the knob is locked, the controller drives the locking means to continue locking the knob if the controller determines that the operating force is applied in the predetermined direction, and the controller drives the locking means to release the locking of the knob if the controller determines that the operating force is not applied in the predetermined direction; and
wherein the turning direction detecting means includes an elastic member that bends when the knob is turned.

21. The force feedback input device according to claim 20, wherein the elastic member is interposed between the turning angle detecting means and the locking means.

22. The force feedback input device according to claim 20, comprising a pair of elastic members disposed opposingly to the locking means, each of the elastic members connected to a side of a chassis.

* * * * *